Jan. 5, 1954  W. E. ODEN  2,665,098
SANIPLUS GARBAGE BARREL SUPPORT
Filed May 2, 1950  2 Sheets-Sheet 1
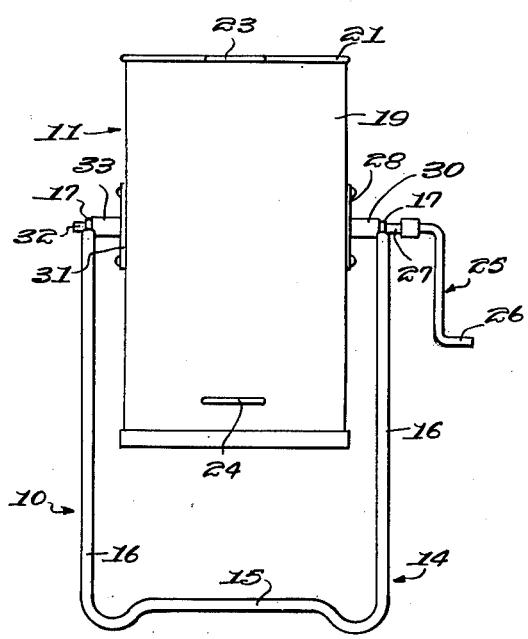
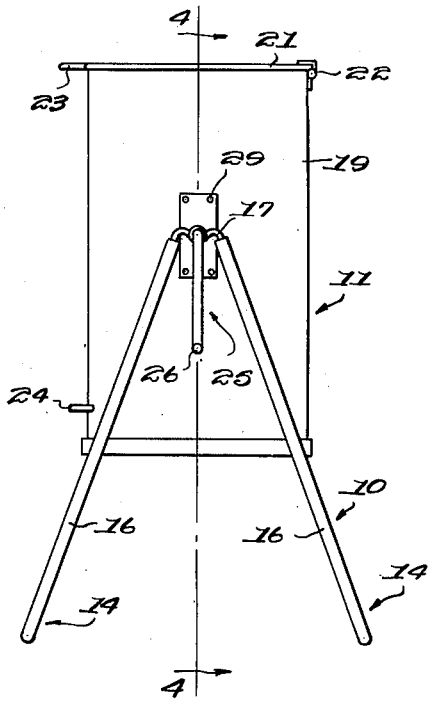
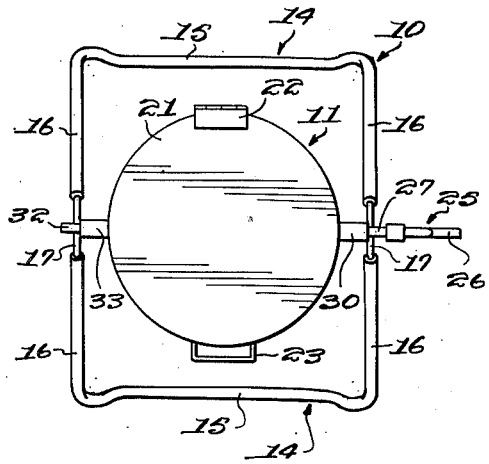
INVENTOR.
William E. Oden,
BY Victor J. Evans & Co.
ATTORNEYS Jan. 5, 1954          W. E. ODEN          2,665,098
SANIPLUS GARBAGE BARREL SUPPORT
Filed May 2, 1950          2 Sheets-Sheet 2
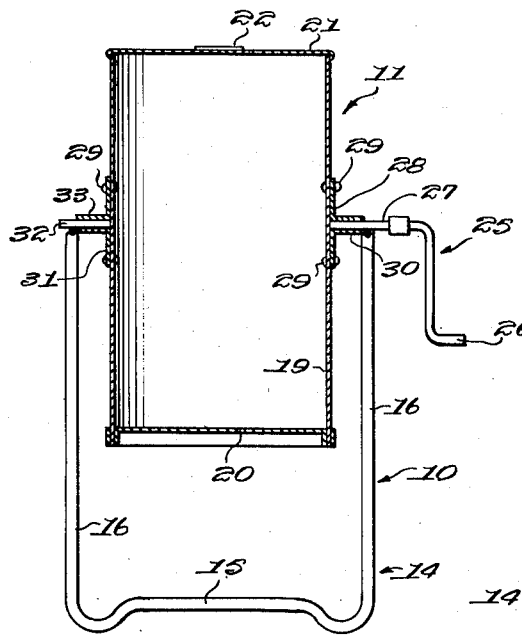
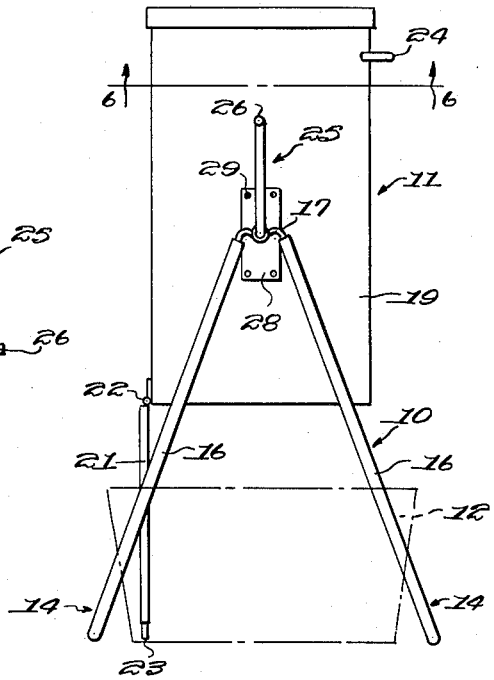
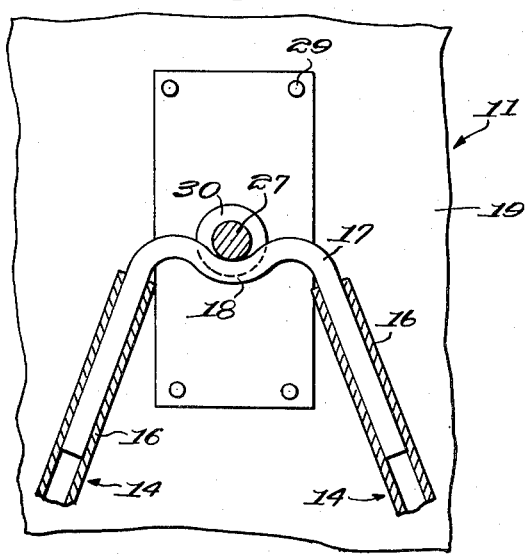
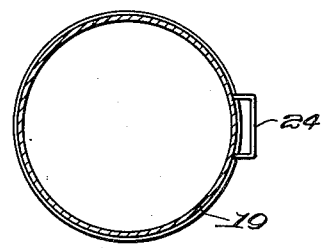
INVENTOR.
William E. Oden,
BY Victor J. Evans & Co.
ATTORNEYS Patented Jan. 5, 1954

2,665,098

UNITED STATES PATENT OFFICE 2,665,098

SANIPLUS GARBAGE BARREL SUPPORT

William E. Oden, Bogalusa, La.

Application May 2, 1950, Serial No. 159,487

1 Claim. (Cl. 248—137)

This invention relates to a container and support therefor, and more particularly to a container and support for holding garbage.

The object of the invention is to provide a garbage container and support which is so constructed that the container will be maintained supported above the level of the ground so that rats, dogs, cats and the like will be unable to upset and spread the contents of the container, thereby eliminating an unsightly and unsanitary condition.

Another object of the invention is to provide a garbage container and support that can be easily filled or emptied, the container including a hinged lid, whereby the chances of losing, misplacing or having the lid stolen are minimized.

Still another object of the invention is to provide a garbage container and support that allows the container to be normally maintained in an upright position, and wherein the container can be manually tilted to dispensing or pouring position at any desired angle.

A further object of the invention is to provide a garbage container and support which is extremely simple and inexpensive to manufacture.

Other objects and advantages will be apparent during the course of the following description.

In the accompanying drawings forming a part of this application, and in which like numerals are used to designate like parts throughout the same:

Figure 1 is front elevational view of the garbage container and support of the present invention, the container being shown in a normally disposed position;

Figure 2 is a side elevational view of the assembly of Figure 1;

Figure 3 is a top plan view of the garbage container and support of the present invention;

Figure 4 is a sectional view taken on the line 4—4 of Figure 2;

Figure 5 is a side elevational view of the garbage container and support, and with the container in an up-ended, dumping position;

Figure 6 is a sectional view taken on the line 6—6 of Figure 5;

Figure 7 is a fragmentary, enlarged side elevational view of the pivotal construction for the container and support;

Figure 8 is an enlarged fragmentary top plan view, with parts broken away and in section, showing the crank construction.

Referring in detail to the drawings, the numeral 10 designates a stand which is adapted to provide a pivotal support for a container or receptacle 11 that is adapted to hold garbage or the like. The container 11 is adapted to be filled with garbage by the housewife or other person, and when the garbage collector desires to empty the container 11, the container can be tilted or pivoted from the position shown in Figure 1 to the position shown in Figure 5, whereby the garbage in the container will fall into a tub 12 (broken lines). The tub 12 can then be readily lifted by the garbage collector and emptied into the garbage truck to be carried away to a suitable location.

The stand 10 comprises a pair of U-shaped legs 14, and each of the legs 14 embodies a horizontally disposed web 15 that connects a pair of vertically disposed, spaced, parallel, tubular standards or sections 16 together. The pair of legs 14 have their upper ends converging toward each other, as best seen in Figures 2 and 5, the lower ends of the legs at their connection with the web being formed to provide bearing ends for the stand. A pair of spaced, parallel substantially U-shaped bearing brackets 17 have their ends snugly positioned in the upper, open ends of the tubular standards 16, each of the bearing brackets 17 including an intermediate, or bight portion 18 which is of inverted arcuate formation as best seen in Figure 7.

The container 11 may have various shapes and sizes, depending upon the quantity of garbage to be placed therein. In the drawings, however, the container 11 is shown to comprise a cylindrical casing 19 which has a body member 20 closing one end thereof, Figure 4. A cover or lid 21 is hingedly connected to the other end of the casing 19 by a hinge 22, and a handle 23 is also connected to the lid 21. Normally, the container 11 is in the position shown in Figures 1 and 2, so that the housewife can easily grip the handle 23 and open the lid 21 so as to be able to deposit or place garbage in the container 11. Then, when the container 11 is to be emptied into the tub 12, the container can be tilted or pivoted by means of a manually operable means, to be described later in this application, whereby the garbage can empty from the container 11 into the tub 12, as shown in Figure 5. A handle 24 is also secured to the exterior of the casing 19 so as to facilitate handling of the latter.

The manually operable means for causing pivotal or tilting movement of the container 11 includes a crank 25. The crank 25 is provided with a hand-engaging portion 26, Figure 4, and the crank 25 further includes a straight portion 27 which defines an axle, the straight portion or axle 27 being rotatably supported by the inverted arcuate shaped bight portion 18 of one of the substantially U-shaped bearing brackets 17. The inner end of the straight portion 27 is secured, as by welding, to a plate 28, and the plate 28 is secured to the exterior of the casing 19 by suitable securing elements, such as rivets 29. A spacing collar 30 is circumposed on the straight portion 27, the spacing collar 30 being interposed between the plate 28 and the corresponding bearing bracket 17, so as to maintain the casing 19 in its proper spaced relation between the legs of the stand 10.

Secured to the opposite side of the casing 19 by suitable securing elements, such as rivets 29, is a plate 31, and the inner end of a stub shaft or axle 32 is secured to the plate 31. A spacing collar 33 is circumposed on the stub shaft 32, and a portion of the stub shaft 32 is rotatably supported on the arcuate shaped bight portion 18 of the other substantially U-shaped bearing bracket 17. Thus, the stub shaft 32 and the straight portion 27 of the crank 25 define axles which enable the container 11 to be tilted or pivoted about a horizontal axis so as to enable the container 11 to be emptied of garbage as desired.

In use, the garbage container of the present invention is normally in the position shown in Figures 1 and 2. The housewife or other person can readily place garbage in the container 11 by gripping the handle 23 and raising the lid 21, whereby garbage or other waste material can be disposed of in the receptacle 11. After the container 11 has been filled with garbage, or when the garbage collector arrives, the operator or user merely grips the portion 26 of the crank 25 and rotates the crank 25 so as to cause the container 11 to be tilted or pivoted to the position shown in Figure 5, whereby garbage in the container will be dispensed or empty into the tub 12. Then, the tub 12 can be readily lifted by the garbage collector and dumped into the garbage truck and carried away to an incinerator or other location. Then, the receptacle or container 11 is again tilted or returned to its normal position, as shown in Figures 1 and 2, so that it can be used again for holding garbage.

By means of the assembly of the present invention, the garbage collector will be able to load the garbage truck without being required to lift a heavy barrel, and it will be noted from the drawings that the casing 19 is bottom heavy, so that it always has a tendency to swing to its normal upright position shown in Figures 1 and 2. In other words, the casing 19 is provided with a pivotal connection which is arranged above its center of gravity. Also, dogs, cats, rats and the like cannot accidentally gain access to the contents of the container 19, so that garbage will not be scattered over areas, thus minimizing filth, disease and the like. The assembly is so constructed that friction between the various parts is minimized, and the various parts can be readily assembled or disassembled in order to occupy a minimum amount of space for storage or transportation. Various sizes and shapes of casings 19 can be used depending uopn the quantity of garbage to be placed therein, and also, the assembly of the present invention can be used for other materials besides garbage. If desired, the stand can be made of rods instead of tubular stock.

I claim:

In a stand for a container, a pair of converging legs, said legs each being hollow and being fabricated of tubular material, each of said legs having a U-shape and including a lower horizontally disposed web shaped to provide bearing ends for the stand, and spaced parallel vertically disposed tubular standards, the distance between the tops of the standards on the legs being less than the distance between the webs of the legs, a pair of spaced parallel substantially U-shaped bearing brackets having an inverted arcuate shaped bight portion, said brackets extending between said legs and having their ends detachably positioned in said tubular standards, the diameter of said brackets being of a dimension to provide a telescoping snug fit between the brackets and standards, each of said brackets including a pair of downwardly diverging end portions, a crank having a horizontally disposed straight portion supported on the inverted bight portion of one of said bearing brackets, a horizontally disposed stub shaft rotatably engaging the other inverted bight portion of said bearing bracket, the straight portion of said crank being arranged in alignment with said stub shaft, a first plate secured to the inner end of the crank, a second plate secured to the inner end of the shaft in opposed aligned relation to said first plate, said plates adapted to be secured to the container, said plates having an arcuate shape to conform to the shape of the container to which they are attached, a first collar circumposed on said stub shaft and interposed between a plate and bight portion of one of the brackets, a second collar circumposed on the straight portion of said crank and interposed between the other bight portion and its adjacent bracket, the center of gravity of said container being arranged below an axis extending through the straight portion of said crank and said stub shaft when the container is in upright position, said crank having a hand gripping portion arranged exteriorly of said legs.

WILLIAM E. ODEN.

References Cited in the file of this patent

UNITED STATES PATENTS

| Number | Name | Date |
|---|---|---|
| 184,213 | McClelland | Nov. 7, 1876 |
| 394,439 | Beckert | Dec. 11, 1888 |
| 957,237 | Moorman | May 10, 1910 |
| 1,227,323 | Russell | May 22, 1917 |
| 1,576,289 | Ledden | Mar. 9, 1926 |
| 1,630,393 | Ledden | May 31, 1927 |
| 1,816,411 | Tillinger | July 28, 1931 |
| 2,292,854 | Wilcox | Aug. 11, 1942 |
| 2,467,866 | Smolderen et al. | Apr. 19, 1949 |

FOREIGN PATENTS

| Number | Country | Date |
|---|---|---|
| 392,502 | Germany | July 12, 1922 |